US009633414B2

(12) United States Patent
Takada

(10) Patent No.: US 9,633,414 B2
(45) Date of Patent: Apr. 25, 2017

(54) UPDATE REGION DETECTION DEVICE

(71) Applicant: NEC Corporation, Minato-ku, Tokyo (JP)

(72) Inventor: Jun Takada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 86 days.

(21) Appl. No.: 14/416,363

(22) PCT Filed: Apr. 30, 2013

(86) PCT No.: PCT/JP2013/002893
§ 371 (c)(1),
(2) Date: Jan. 22, 2015

(87) PCT Pub. No.: WO2014/017003
PCT Pub. Date: Jan. 30, 2014

(65) Prior Publication Data
US 2015/0206281 A1 Jul. 23, 2015

(30) Foreign Application Priority Data

Jul. 25, 2012 (JP) ................................. 2012-164739

(51) Int. Cl.
*G09G 5/00* (2006.01)
*G06T 3/40* (2006.01)
(Continued)

(52) U.S. Cl.
CPC .......... *G06T 3/4038* (2013.01); *G06F 3/1415* (2013.01); *G06T 7/0081* (2013.01);
(Continued)

(58) Field of Classification Search
CPC ..................................................... H04N 19/60
(Continued)

(56) References Cited

U.S. PATENT DOCUMENTS

2008/0198930 A1* 8/2008 Matsubayashi ...... H04N 21/235
375/240.15
2012/0219233 A1* 8/2012 Uro ........................... G06T 9/00
382/239
(Continued)

FOREIGN PATENT DOCUMENTS

JP 2000020566 A 1/2000
JP 2005033763 A 2/2005
(Continued)

OTHER PUBLICATIONS

International Search Report for PCT Application No. PCT/JP2013/002893, mailed on Aug. 6, 2013.

*Primary Examiner* — Thomas Lett

(57) ABSTRACT

A removal region detection means detects a rectangular non-update region from a circumscribed rectangle of all update blocks. An update region dividing means divides the circumscribed rectangle of all update blocks into two or more rectangular update regions not including the detected non-update region. If the number of update regions after the division does not exceeds a threshold, a division processing control means recursively applies the processing by the removal region detection means on the update regions after the division, and recursively applies the processing by the update region dividing means based on the detected non-update region. The division processing control means terminates repetition of the division processing of the update region on a condition that a new non-update region is not detected any more by the removal region detection means, or that the number of update regions exceeds the threshold, whichever is satisfied earlier.

14 Claims, 10 Drawing Sheets

(51) Int. Cl.
*G06F 3/14* (2006.01)
*G09G 5/393* (2006.01)
*G06T 7/00* (2017.01)

(52) U.S. Cl.
CPC ....... *G09G 5/393* (2013.01); *G09G 2320/103* (2013.01); *G09G 2370/022* (2013.01)

(58) Field of Classification Search
USPC .......................................................... 345/666
See application file for complete search history.

(56) References Cited

U.S. PATENT DOCUMENTS

| | | | |
|---|---|---|---|
| 2012/0229664 A1* | 9/2012 | Solomon | H04N 5/23229 348/222.1 |
| 2013/0155075 A1* | 6/2013 | Matsui | G06T 9/001 345/501 |
| 2014/0056473 A1* | 2/2014 | Tojo | G06K 9/3241 382/103 |

FOREIGN PATENT DOCUMENTS

| JP | 2007140593 A | 6/2007 |
|---|---|---|
| JP | 2009017414 A | 1/2009 |
| JP | 2011040808 A | 2/2011 |
| JP | 2012074999 A | 4/2012 |
| JP | 2012120066 A | 6/2012 |

\* cited by examiner

UPDATE REGION DETECTION DEVICE

This application is a National Stage Entry of PCT/JP2013/002893 filed on Apr. 30, 2013, which claims priority from Japanese Patent Application 2012-164739 filed on Jul. 25, 2012, the contents of all of which are incorporated herein by reference, in their entirety.

TECHNICAL FIELD

The present invention relates to an update region detection device, and in particular, to an update region detection device, an update region detection method, and a program, for detecting an update region from previous and subsequent frames of drawing data such as a computer screen.

BACKGROUND ART

In recent years, in order to prevent information leakage from computer terminal devices, to facilitate management of applications on the terminal side, and the like, a thin client system has come to be introduced, in which all applications to be input/output by and displayed on terminal devices are executed by a server device and all generated files, accompanying thereto, are also managed in the server device.

In such a thin client system, drawing data of an application program executed by a server device is transferred to a terminal device on the client side over a network such as LAN, and is displayed on a screen of the terminal device. As such, if the processing amount of drawing data increases or if the number of terminal devices to be connected with the server device increases, the load placed on the server device for transferring the drawing data to the terminal devices increases, which causes problems such as degradation in response time and a significant limitation to the number of connecting terminal devices.

As such, as a technology to control displaying of drawing data by software, it has been considered to clip only a rectangle drawing region including a drawing data portion in which the drawing is updated within one screen, and further, compress it as required and transmits it, to thereby reduce the amount of data involved in transfer of the drawing data of the computer screen so as to reduce the load placed on the server device.

Various methods have been proposed to detect an update region. For example, Patent Document 1 discloses a method of dividing a screen into blocks, and transferring only blocks including pixel differences. Further, in Patent Document 2, "background art" section, for example, describes a method of transferring an image included in a smallest rectangular region including all regions in which differential values from the previous frame are detected.

Further, in Patent Document 2, "best mode for carrying out the invention" section, for example, describes an update region detection method as described below. First, a screen is divided into blocks, and for each block, the smallest rectangular region, including all regions in which differential values from the previous frame are detected, is detected. Next, if both blocks adjacent to each other horizontally or laterally include the rectangular regions and the rectangular regions are in contact with each other horizontally or laterally, a smallest rectangular region including both rectangular regions of the blocks adjacent to each other horizontally or laterally are used as an update region.

On the other hand, Patent Document 3 discloses a method of dividing a right-angled polygon area, generated on a layout surface of an integrated circuit by a floor plan, into a plurality of rectangular regions. Further, Patent Document 4 discloses a method of detecting a rectangle having the largest area within one region, from among a plurality of regions present in an image. However, Patent Documents 3 and 4 fail to suggest applying the technologies to processing of detecting an update region from previous and subsequent frames of drawing data. Further, Patent Documents 1 and 2 do not contain description suggesting dividing a region into a plurality of rectangular regions when detecting an update region from previous and subsequent frames of drawing data, and detecting a rectangle having the largest area within one region.

Patent Document 1: JP 2009-017414 A
Patent Document 2: JP 2005-033763 A
Patent Document 3: JP 2000-020566 A
Patent Document 4: JP 2007-140593 A

SUMMARY

As described in Patent Document 1, if a set of blocks including pixels in which pixel values are changed is used as an update region, in order to specify the update region, the coordinate values of all blocks, including the pixels in which the pixel values are changed, must be described. As such, the amount of data which must be transferred for specifying the update region increases, causing difficulty in reducing the amount of data to be transmitted.

Further, if a rectangle including all pixels in which the pixel values are changed is used as an update region as described in the "background art" section of Patent Document 2, if pixels in which the pixel values are changed are widely separated, a large region in which pixel values are not changed is also incorporated in the update region. Accordingly, the area encoded as an image increases, whereby it is difficult to reduce the amount of data to be transferred.

Moreover, as described in the "best mode for carrying out the invention" section of Patent Document 2, in the method of detecting, for each block, a smallest rectangular region including all regions in which differential values from the previous frame are detected, and if both blocks adjacent to each other horizontally or laterally include the rectangular regions and the rectangular regions are in contact with each other horizontally or laterally, using the smallest rectangular region including both rectangular regions of the blocks adjacent to each other horizontally or laterally as an update region, a case where a large region in which pixel values are not changed is incorporated in an update region is caused. Specifically, in the case where pixel differences are generated in a square frame-like shape in a screen, in the method of Patent Document 2, a circumscribing rectangle of the frame is detected as an update region. Consequently, even the region in which pixel values are not changed is included in the update region.

An object of the present invention is to provide an update region detection device which solves the above-described problems, that is, the problems that the following cases are caused: if a set of blocks including pixels in which pixel values are changed is used as an update region, the amount of data for indicating the coordinates of the update region increases; if a circumscribing rectangle of all blocks including pixels in which pixel values are changed is used as an update region, the size of the update region becomes unnecessarily large; and if an update region is detected for each block and update regions linked laterally or horizontally are integrated in a circumscribing rectangle thereof, a large region in which pixel values are not changed is incorporated in the update region.

An update region detection device, according to an aspect of the present invention, includes:

an update block detection means for comparing pixel values of pixels at a same position in a current frame and in a previous frame of an input video, and among blocks generated by dividing a frame into blocks, detecting, as an update block, a block including a pixel in which a pixel value is changed;

an initial update region registration means for registering a circumscribed rectangular region of all of the update blocks detected by the update block detection means, as an update region, in an update region storage means;

a removal region detection means for detecting a non-update region from among one or more update regions stored in the update region storage means, the non-update region being a rectangle including blocks which do not include a pixel in which a pixel value is changed and are continued for one or more;

update region dividing means for dividing the update region including the non-update region, detected by the removal region detection means, into new update regions which are two or more rectangles not including the non-update region;

an update region list rewrite means for deleting the update region before the division from the update region storage means, and additionally registering the update regions after the division in the update region storage means; and a division processing control means for controlling repetition of division processing of the update region by the removal region detection means, the update region dividing means, and the update region list rewrite means, and terminating the repetition of the division processing on a condition that a new non-update region is not detected any more by the removal region detection means, or that the number of update regions stored in the update region storage means after the additional registration exceeds a threshold, whichever is satisfied earlier.

An update region detection method, according to another aspect of the present invention, includes:

an update block detection step of comparing pixel values of pixels at a same position in a current frame and in a previous frame of an input video, and among blocks generated by dividing a frame into blocks, detecting, as an update block, a block including a pixel in which a pixel value is changed;

an initial update region registration step of registering a circumscribed rectangular region of all of the detected update blocks as an update region in an update region storage means;

a removal region detection step of detecting a non-update region from among one or more update regions stored in the update region storage means, the non-update region being a rectangle including blocks which do not include a pixel in which a pixel value is changed and are continued for one or more;

an update region dividing step of dividing the update region including the detected non-update region into new update regions which are two or more rectangles not including the non-update region;

an update region list rewrite step of deleting the update region before the division from the update region storage means, and additionally registering the update regions after the division in the update region storage means; and a division processing control step of controlling repetition of division processing of the removal region detection step, the update region dividing step, and the update region list rewrite step, and terminating the repetition of the division processing on a condition that a new non-update region is not detected any more in the removal region detection step any more, or that the number of update regions stored in the update region storage means after the additional registration exceeds a threshold, whichever is satisfied earlier.

As the present invention has the above-described configuration, the following advantageous effects can be achieved. First, it is possible to reduce the amount of data for indicating the coordinates of update regions, compared with the case of using a set of blocks including pixels in which pixel values are changed. Further, the size of an update region can be smaller, compared with the case of using a circumscribed rectangle of all blocks including pixels in which pixel values are changed. Furthermore, it is less likely to incorporate a large region in which pixel values are not changed into an update region, compared with the case of detecting an update region for each block and integrating the update regions, linked vertically or horizontally, into a circumscribed rectangle thereof.

EXEMPLARY EMBODIMENTS

Next, exemplary embodiments of the present invention will be described in detail with reference to the drawings.
[First Exemplary Embodiment]

Figure 1:
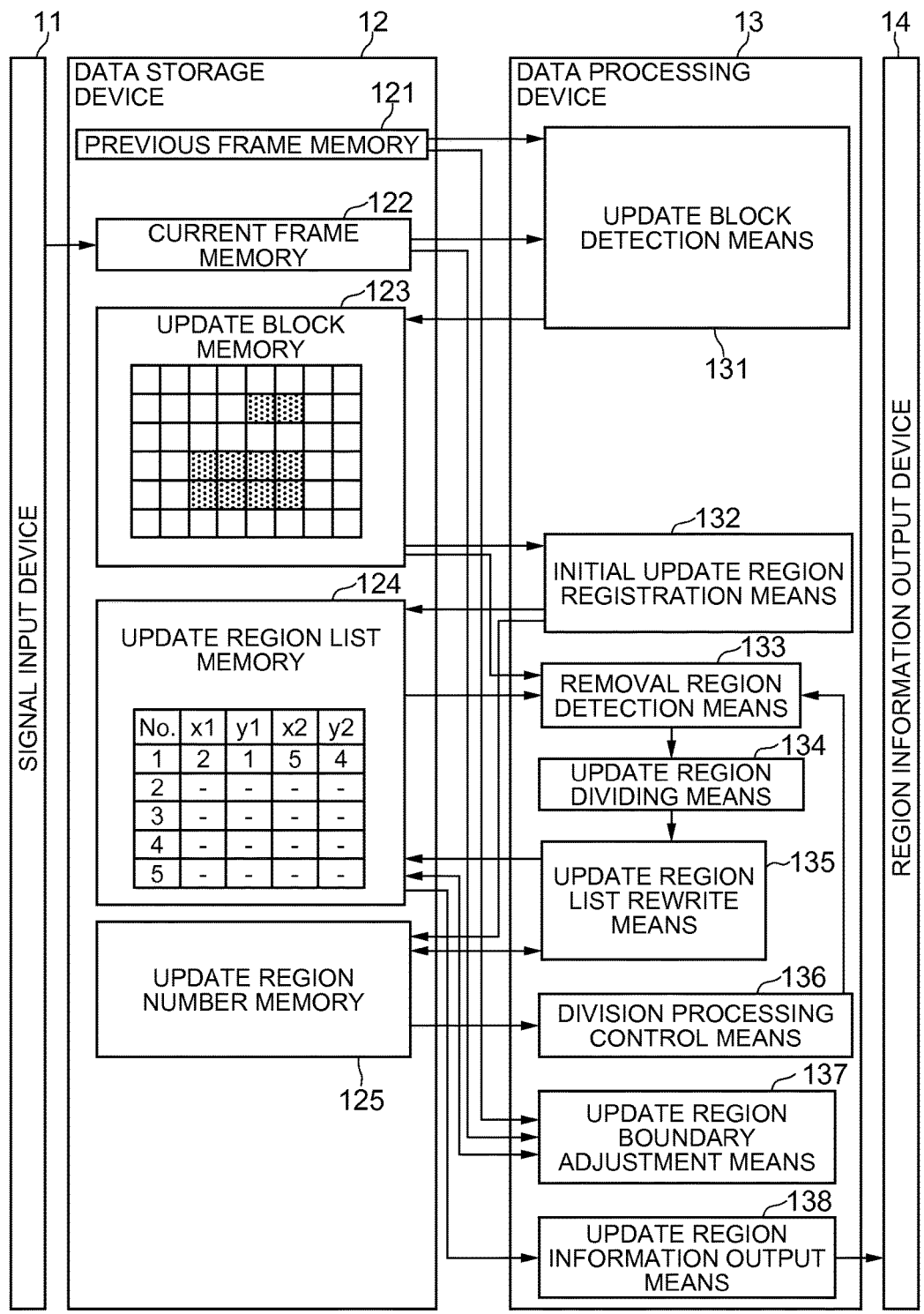
FIG. 1 is a block diagram of a first exemplary embodiment of the present invention.

Referring to FIG. 1, an exemplary embodiment of the present invention includes a signal input device 11, a data storage device 12, a data processing device 13 operated by program control, and a region information output device 14.
[Description of Configuration]

The signal input device 11 is a device for inputting video signals, which performs analog capture or digital capture of color video signals of a display screen of a computer not shown, and stores them in the data storage device 12, for example. The captured video signals for one screen is called a frame or screen data.

The region information output device 14 includes a storage device such as a magnetic disk device and a communication device, each of which stores or transmits coordinate information of an update region output from the data processing device 13.

The data storage device 12 includes a previous frame memory 121, a current frame memory 122, an update block memory 123, an update region list memory 124, and an update region number memory 125.

The previous frame memory 121 holds one or more frames input in the past. The frames input in the past are called previous frames below.

The current frame memory 122 holds one frame which is input most lately. The frame which is input most lately is called a current frame. The previous frame corresponds to a frame immediately before the current frame in terms of time, for example.

The update block memory 123 divides a frame by a given pixel size (for example, m×n, each of m and n represents an integer of one or larger), and for each of the divided blocks, holds data indicating whether or not there is a difference between the previous frame and the current frame. There is a difference means the pixel value of a pixel in the current frame differs from the pixel value of a pixel in the previous frame at the same position as that of the pixel in the current frame.

The update region list memory 124 holds a coordinate sequence representing an update region. It is assumed that an update region is configured of one or more rectangles, and that the update region list memory 124 stores coordinate values of an upper end, a lower end, a left end, and a right end showing each rectangle. For example, it is assumed that an X-Y coordinate system is defined on a frame, and the position on the frame is specified by the X-Y coordinate values. Further, it is also assumed that each rectangle is specified by the X-Y coordinate values at two points at the upper left end and the lower right end.

The update region number memory 125 holds the number of rectangles stored at the current time in the update region list memory 124.

The data processing device 13 includes an update block detection means 131, an initial update region registration means 132, a removal region detection means 133, an update region dividing means 134, an update region list rewrite means 135, a division processing control means 136, an update region boundary adjustment means 137, and an update region information output means 138.

The update block detection means 131 reads data of the previous frame from the previous frame memory 121 and data of the current data from the current frame memory 122, respectively, and compares pixel values by each of the blocks. As a result of comparison, the update block detection means 131 writes data representing presence or absence of update in the update block memory 123 in such a manner that a block including a pixel in which the pixel value is changed is determined to be updated and a block not including such a pixel is determined not to be updated.

The initial update region registration means 132 reads information of update blocks from the update block memory 123, and if there is at least one update block within the screen, the initial update region registration means 132 obtains a smallest rectangle including all update blocks, and determines this rectangle to be the first update region and writes the coordinate thereof in the update region list memory 124. The initial update region registration means 132 also writes 1 as an initial value of the number of update region, in the update region number memory 125.

The removal region detection means 133 detects, for all update regions registered in the update region list memory 124, rectangles which are masses of non-update blocks present within the update region. Further, among the rectangles which are masses of non-update blocks detected from all of the update regions, the removal region detection means 133 selects a rectangle having the largest area as a removal region. If a rectangle which is a mass of non-update blocks is detected from any of the update regions and a removal region is selected, the removal region detection means 133 notifies the update region dividing means 134 of coordinate information of the removal region and the update region including the removal region.

Based on the coordinate information of the removal region and the update region including the removal region notified by the removal region detection means 133, the update region dividing means 134 divides the rectangle of the update region, including the removal region, into four rectangles at a maximum, except for the removal region. Further, the update region dividing means 134 notifies the update region list rewrite means 135 of information of the update region before the division and the update region after the division.

The update region list rewrite means 135 deletes the update region before the division from the update region list memory 124, and adds the update region after the division to the update region list memory 124. Further, based on removal and addition of the update regions, the update region list rewrite means 135 updates the number of update regions stored in the update region number memory 125.

The division processing control means 136 controls repetition of division processing of update regions performed by the removal region detection means 133, the update region dividing means 134, and the update region list rewrite means 135. The division processing control means 136 terminates repetition of division processing of update regions performed by the removal region detection means 133, the update region dividing means 134, and the update region list rewrite means 135, on a condition that the number of update regions stored in the update region number memory 125 reaches a predetermined number, or the removal region detection means 133 does not detect a removal region any more, whichever is satisfied earlier.

After the division processing of update regions by the removal region detection means 133, the update region dividing means 134, and the update region list rewrite means 135, the update region boundary adjustment means 137 extracts coordinate information of the update regions from the update region list memory 124 one by one, and performs fine adjustment of the coordinates of the upper end, lower end, left end, and right end of each update region. Specifically, for each boundary lines of top, bottom, left, and right, the update region boundary adjustment means 137 reads pixel values from the previous frame memory 121 and the current frame memory 122 and checks presence or absence of a difference, and contracts the boundary by one line until a differential pixel is found. The update region boundary adjustment means 137 performs this processing on each update region, and updates the coordinate values stored in the update region list memory 124.

The update region information output means 138 outputs the coordinate information of the update region stored in the update region list memory 124, to the region information output device 14.

[Description of Operation]

Figure 2:
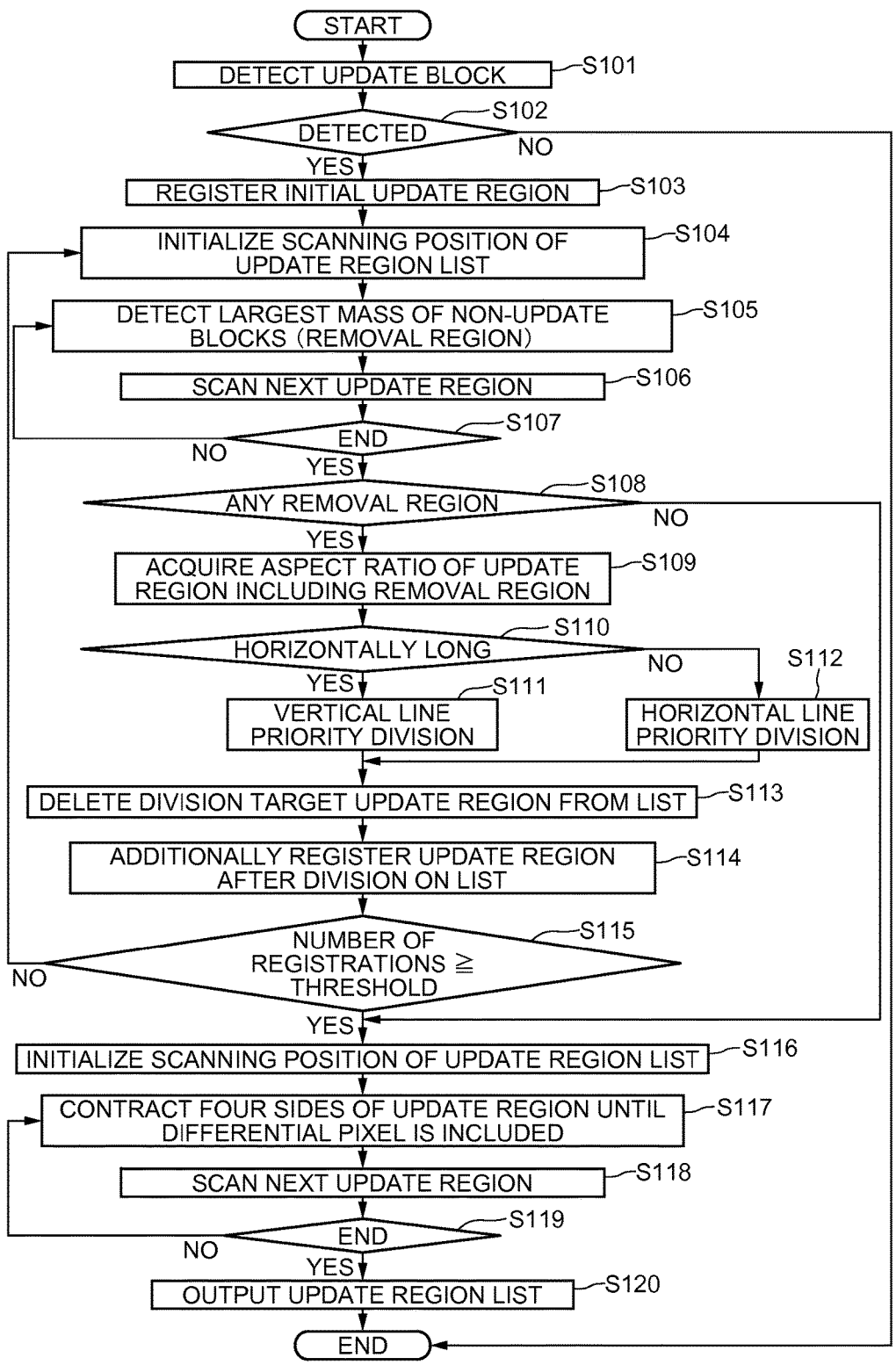
FIG. 2 is a flowchart showing an example of processing according to the first embodiment of the present invention.

Next, the entire operation of the present embodiment of the present invention will be described in detail with reference to the flowchart of FIG. 2.

First, the update block detection means 131 reads data of the previous frame from the previous frame memory 121 and data of the current frame from the current frame memory 122, respectively, and compares pixel values for each of the blocks. As a result of comparison, the update block detection means 131 writes data representing presence or absence of update in the update block memory 123 in such a manner that a block including a pixel in which the pixel value is changed is determined to be updated and a block not including such a pixel is determined not to be updated (step S101).

Next, the initial update region registration means 132 reads information of update blocks from the update block memory 123, and determines whether or not there is at least one update block (step S102). If there is no update block (NO at step S102), the initial update region registration means 132 terminates the processing shown in FIG. 2. If there is any update block (YES at step S102), the processing proceeds to step S103 and after.

At step S103, the initial update region registration means 132 obtains a smallest rectangle including all update blocks, and determines this rectangle to be the first update region and writes the coordinate thereof in the update region list memory 124 (step S103). Further, in the same step S103, the initial update region registration means 132 writes 1 as an initial value of the number of update regions, in the update region number memory 125.

Next, the removal region detection means 133 initializes the scanning position of the update region list memory 124 to the top of the list (step S104).

Then, regarding the update region of the scanning position, the removal region detection means 133 detects a rectangle consisting of a mass of non-update blocks having the largest area within the update region (step S105). Further, in the same step S105, the removal region detection means 133 further stores, as a removal region, a rectangle having the largest area among rectangles each consisting of a mass of non-update blocks detected in the past, including the update region having been scanned, and further stores the update region including the removal region.

Then, the removal region detection means 133 moves the update region scanning position by one (step S106), and determines whether or not processing has been completed for all update regions (step S107). If it has not been completed (NO at step S107), the removal region detection means 133 goes back to step S105 and performs the processing on the remaining update region. If it has been completed for all update regions (YES at step S107), the processing proceeds to step S108 and after.

At step S108, the division processing control means 136 determines whether or not a removal region is detected by the removal region detection means 133. If it is not detected (NO at step S108), the processing proceeds to step S116 and after, while if it is detected (YES at step S108), the processing proceeds to step S109 and after.

In the case of proceeding to step S108, based on the coordinate information of the removal region and the update region including the removal region detected and stored by the removal region detection means 133, the update region dividing means 134 divides the rectangle of the update region, including the removal region, into four rectangles at a maximum except for the removal region, as described below (steps S109 to S112).

First, from the coordinate information of the update region including the removal region, the update region dividing means 134 calculates an aspect ratio of the region (step S109). Next, the update region dividing means 134 determines the aspect ratio (step S110), and if it is horizontally long (width>height) (YES at step S110), the update region dividing means 134 performs vertical line priority division (step S111). If it is not horizontally long (width≤height) (NO at step S110), the update region dividing means 134 performs horizontal line priority division (step S112). In the vertical line priority division at step S111, if there are a plurality of ways to take a parting line with respect to the update region including the removal region, a dividing method of giving priority to division into left and right portions (vertical parting line) is used. Further in the horizontal line priority division at step S112, if there are a plurality of ways to take a parting line with respect to the update region including the removal region, a dividing method of giving priority to division into upper and lower portions (horizontal parting line) is used.

Next, the update region list rewrite means 135 deletes the update region before division from the update region list memory 124 (step S113), and adds the update region after division to the update region list memory 124 (step S114). Further, along with deletion and addition, the update region list rewrite means 135 updates the number of update regions stored in the update region number memory 125.

Next, the division processing control means 136 compares the number of update regions (the number of registrations) stored in the update region number memory 125 with a given threshold (step S115). If the number of registrations is less than the threshold (NO at step S115), the division processing control means 136 goes back to step S104 and attempts to further divide the update region. If the number of registrations is not less than the threshold (YES at step S115), the processing proceeds to step S116.

At steps S116 to S119, the update region boundary adjustment means 137 performs adjustment processing of update region boundaries as described below. First, the update region boundary adjustment means 137 initializes the scanning position of the update region list memory 124 to the top of the list (step S116).

Then, regarding the update region of the scanning position, the update region boundary adjustment means 137 reads the coordinates of the upper end, lower end, left end, and right end thereof, from the update region list memory 124. Then, for each of the boundary lines specified by the coordinates of the upper end, lower end, left end, and right end, the update region boundary adjustment means 137 reads pixel values from the previous frame memory 121 and the current frame memory 122 to thereby check presence or absence of a difference, and contracts the boundary by one line until a differential pixel is found (step S117). Specifically, for example, the update region boundary adjustment means 137 reads the pixel values of a pixel on the upper end line, specified by the coordinate of the upper end stored in the update region list memory 124, from the previous frame memory 121 and the current frame memory 122 to thereby check whether or not there is a difference, and if there is no difference, the update region boundary adjustment means 137 contracts the coordinate value of the upper end, stored in the update region list memory 124, by one line in an inner direction of the update region, and repeats the processing which is the same as the previous time for the upper end line specified by the new coordinate of the upper end, again. If there is a difference, as the upper end line is settled, the update region boundary adjustment means 137 then performs the processing on the lower end line, which is the same as that performed on the upper end line, and contracts the boundary at the lower end by one line in an inner direction of the update region until a differential pixel is found. When the lower end line is settled, the update region boundary adjustment means 137 then performs processing on the left end line, and finally, performs processing on the right end line. The sequence of upper end, lower end, left end, and right end is illustrated as an example, and the sequence may not be in this order.

Then, the update region boundary adjustment means 137 moves the update region scanning position by one (step S118), and determines whether or not the processing has been completed for all update regions (step S119). If it has not been completed (NO at step S119), the update region boundary adjustment means 137 goes back to step S117 and performs processing on the remaining update region. If it has been completed for all update regions (YES at step S119), the processing proceeds to step S120.

In the case of proceeding to step S120, the update region information output means 138 outputs the coordinate information of the update region stored in the update region list memory 124, to the region information output device 14.

As described above, according to the present embodiment, it is possible to reduce the amount of additional data for indicating the coordinates of update regions, compared with the case of using a set of blocks including the pixels in which the pixel values are changed. This is because division processing of the update region is terminated on a condition that a new non-update region is not detected any more by the removal region detection means 133, or the number of update regions after additional registration by the update region list rewrite means 135 exceeds the threshold, whichever is satisfied earlier. As such, an increase in the number of update regions can be restrained.

Further, according to the present embodiment, the size of an update region can be smaller, compared with the case of using a circumscribed rectangle of all blocks including the pixels in which the pixel values are changed. This is because an update region having a non-update region in which blocks, not including a pixel in which the pixel value is changed, are continued for one or more is used as a division target, and it is divided into two or more rectangular update regions not including an non-update region.

Further, according to the present embodiment, it is less likely to incorporate a large region in which a pixel value is not changed into an update region, compared with the case of detecting an update region for each block and integrating the update regions, linked vertically or horizontally, into a circumscribed rectangle thereof. This is because the present embodiment does not integrate a plurality of update regions into one rectangle, but divides one rectangle into two or more update regions not including the non-update region in the one update region.

Further, according to the present embodiment, as masses are removed in the decreasing order of the size among the non-update regions included in all update regions, it is possible to reduce the risk of encoding a large non-update region.

It should be noted that in the above description, a method of first obtaining update regions in units of blocks and then adjusting the boundary of each update region by the update region boundary adjustment means 137 has been described. Regarding the size of a block, setting the size to be 8×8 to 32×32 provides a favorable balance between the processing speed and the accuracy, according to the experience. However, if the size of a block is 1×1 pixel, in particular, as the boundary of the update block obtained by the update region dividing means 134 substantially becomes the boundary of the update region on a pixel basis, subsequent update region boundary adjustment processing is not required. In that case, update region boundary adjustment processing may be omitted.

Further, in the above description, while as a condition for a removal region detected by the removal region detection means 133, the area being the largest among the detected non-update blocks is adopted, another condition may be used. For example, it is acceptable to adopt a condition of having an area of a threshold or more, and further, to lower the threshold gradually each time the division processing control means 136 performs processing. Thereby, as it is possible to find a plurality of removal region by scanning all update regions only once, the number of repetitions by the division processing control means 136 can be reduced, and the processing becomes faster.

Further, as a condition for a removal region to be detected by the removal region detection means 133, a condition that a mass has the largest area among the masses of the detected non-update blocks and has an area not less than a given lower limit area may be used. Thereby, as division is not performed if the area reduction effect achieved by region division is small, it is possible to restrain an increase in the amount of additional data.

Further, in the above description, while the update region detection device is operated such that the update region dividing means 134 gives priority to division into left and right portions for laterally long update regions and gives priority to division into upper and lower portions for update rectangles other than laterally long ones, it is possible to always use either one of the division methods, or to use either one of them at random. It should be noted that in the case of using the above-described division method, as the resultant update regions are not flattened excessively, there is an advantage that the compression rate when two-dimensional image compression is applied to the update regions is improved.

Further, in the above description, while it has been described that a horizontal line priority division is selected in the case where the update region is neither horizontally long nor vertically long (where width=height), it is acceptable to select vertical line priority division.

Further, while the above description does not specifically describe a method of detecting a "mass of non-update blocks", it can be determined freely by the designer according to conditions such as high-speed performance, accuracy, and the like. For example, an algorithm for searching a mass having the largest area among "masses of 0 value element of square (1×1, 2×2, 3×3, . . . )" from binary arrays at a high speed is known. By using this, the removal region detection means 133 may be operated by adding constrain of detecting a square mass of non-update blocks. Further, a method of expanding it to an oblong may be used. For example, first, a mass having the largest area among "square masses of non-update blocks" is searched from an update region by means of the method described above. Then, based on the square obtained through the search, an attempt is made to expand the boundaries of the top, bottom left, and right by one block width, to thereby obtain an "oblong mass of non-update blocks" finally. In any way, while it is an approximate solution as a "largest mass of non-update blocks in an update block", the processing can be performed at a significantly high speed, compared with a method of detecting the largest mass in an arbitrary shape. In particular, in a video on a computer screen, as a rectangle region is likely to vary, if a mass of non-update blocks is also processed as a rectangle, it is often the case that sufficient accuracy can be secured. As such, by taking any of the above-described methods, both processing speed and accuracy can be achieved in a good balance.

[Second Exemplary Embodiment]

The present embodiment describes the first exemplary embodiment more specifically. FIGS. 3 to 6 show specific examples of operation of the update region detection device according to the present embodiment. In the present embodiment, a threshold of the number of update regions is 5.

Figure 3:
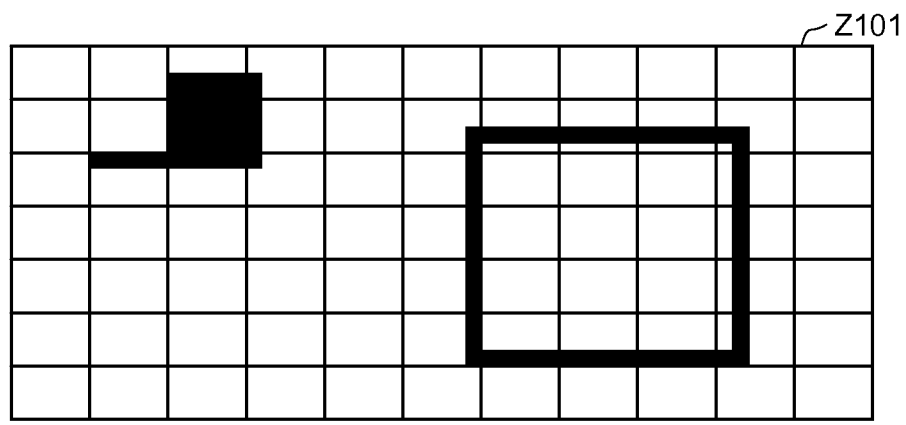
FIG. 3 is a diagram exemplary showing a differential region between previous and subsequent frames, an update block, and an initial update region, according to a second embodiment of the present invention.
Figure 3:
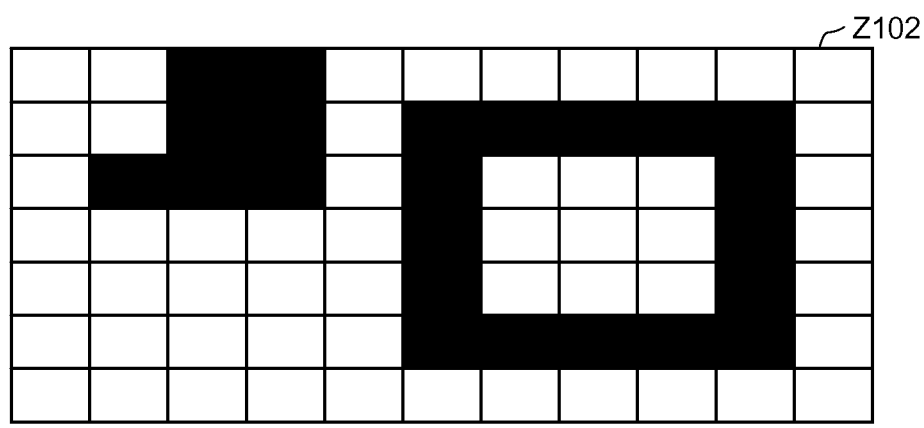
Figure 3:
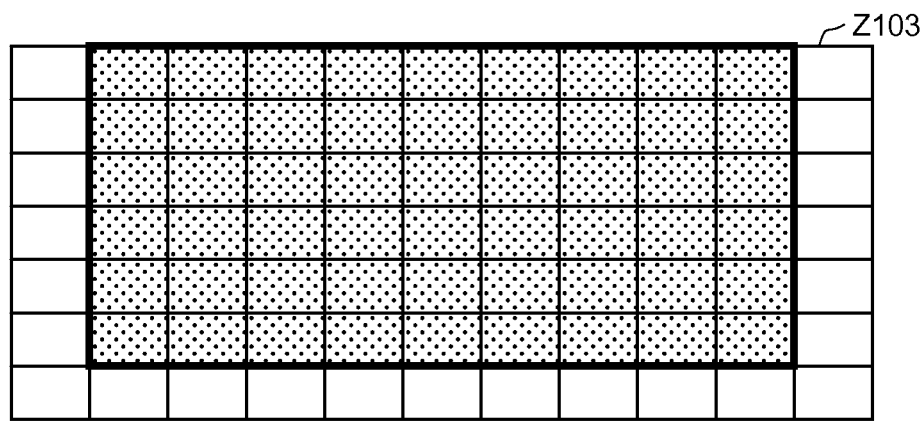

Z101 in FIG. 3 shows a state of block division of a frame (11 width×7 height) and differential pixels (shown in block).

Z102 shows a state of the update block memory 123 after the update block detection means 131 is applied to the frame. The blocks including the differential pixels (black in Z101) are detected as update blocks (black in Z102).

Z103 shows a range of an initial update region registered by the initial update region registration means 132. A circumscribed rectangle of all update blocks (black in Z102) is registered as an initial update region (shaded region in Z103).

Figure 4:
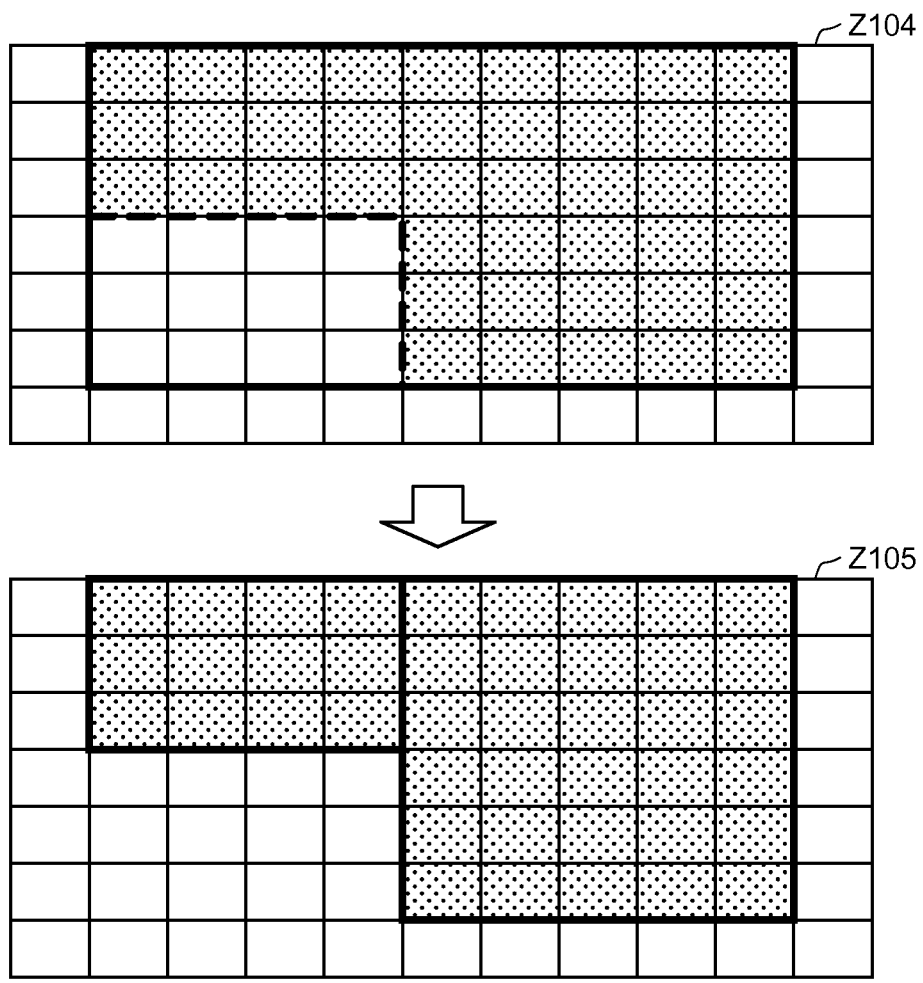
FIG. 4 is an illustration of update region division processing of the first time according to the second exemplary embodiment of the present invention.

Z104 in FIG. 4 shows a removal region which is detected first by the removal region detection means 133. A rectangle shown by broken lines is a removal region, and a rectangle shown by thick lines is an update region including the removal region. The removal region detection means 133 detects a mass of non-update blocks from all update regions present in the screen (in this case, the initial update region only), and detects one having the largest area as a removal region. In the case of Z104, 4×3 blocks at the lower left in the initial region are detected as a mass of non-update blocks having the largest area and selected as a removal region. It should be noted that as a mass of non-update blocks, although non-update blocks of 3×3 blocks inside the frame-like update block, for example, is also detected, as it is not the largest area, it is rejected.

Z105 shows a state of dividing the update region by the update region dividing means 134 for the first time. The shaded region is the entire update region registered at the current time, and the thick lines are boundary lines of new update regions generated by the division. As shown in Z104, the size of the update region to be divided is 9 blocks width×6 blocks height, which is horizontally long. Accordingly, a division method in which a vertical parting line is preferentially selected is taken. Consequently, the update region is divided into left and right portions in a form not including the removal region, whereby two new update regions as shown in Z105 are obtained.

Figure 5:
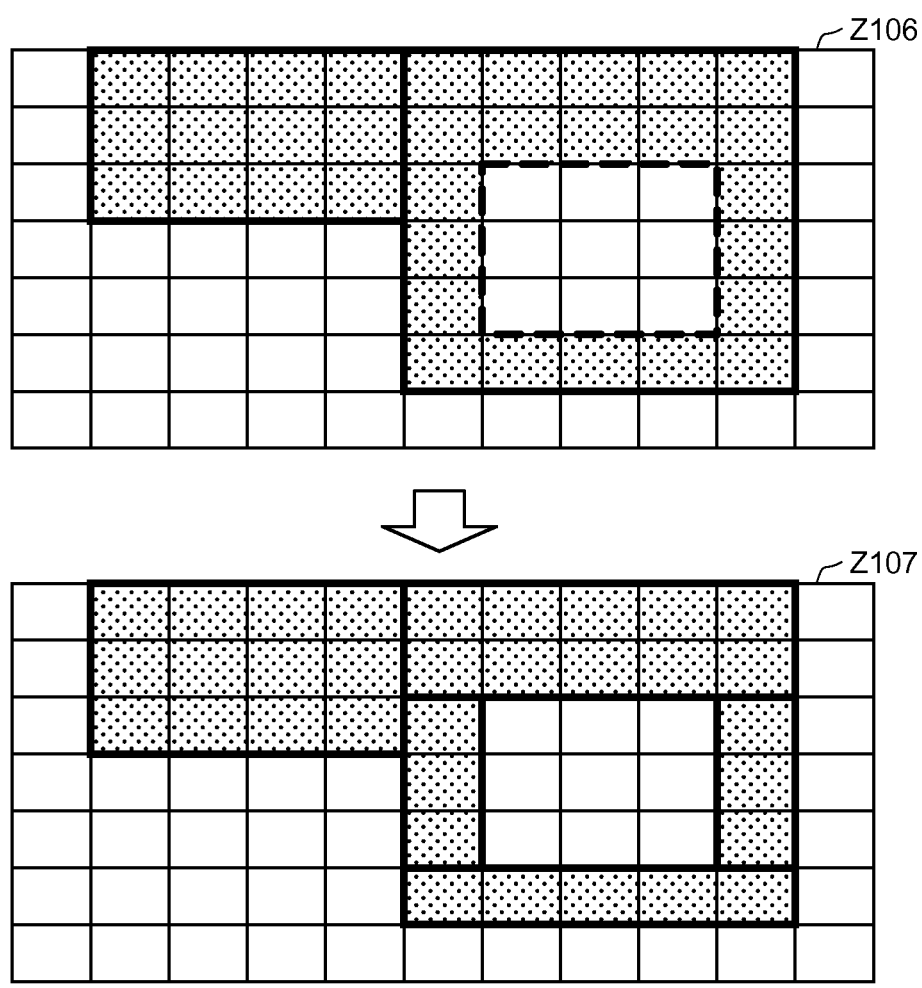
FIG. 5 is an illustration of update region division processing of the second time according to the second exemplary embodiment of the present invention.

Z106 in FIG. 5 shows a removal region detected next by the removal region detection means 133. A rectangle shown by broken lines is a removal region, and a rectangle shown by thick lines is an update region including the removal region. The removal region detection means 133 detects a mass of non-update blocks from all update regions present in the screen (in this case, two), and detects one having the largest area as a removal region. Consequently, non-update blocks of 3×3 blocks, present inside the frame-like update blocks, are detected as a removal region.

Z107 shows a state of dividing the update region by the update region dividing means 134 for the second time. The shaded region is the entire update region registered at the current time, and the thick lines are boundary lines of new update regions generated by the division. As shown in Z106, the size of the update region to be divided is 5 blocks width×6 blocks height, which is not horizontally long. Accordingly, a division method in which a horizontal parting line is preferentially selected is taken. Consequently, the update region is divided into top, intermediate, and bottom portions in a form not including the removal region, whereby four new update regions as shown in Z107 are obtained.

At the point of time when the update region is divided as shown in Z107, the number of update regions is 5, which is equal to the threshold 5. Consequently, repetition of division processing is terminated, and the update region detection device operates to move to boundary adjustment processing.

Figure 6:
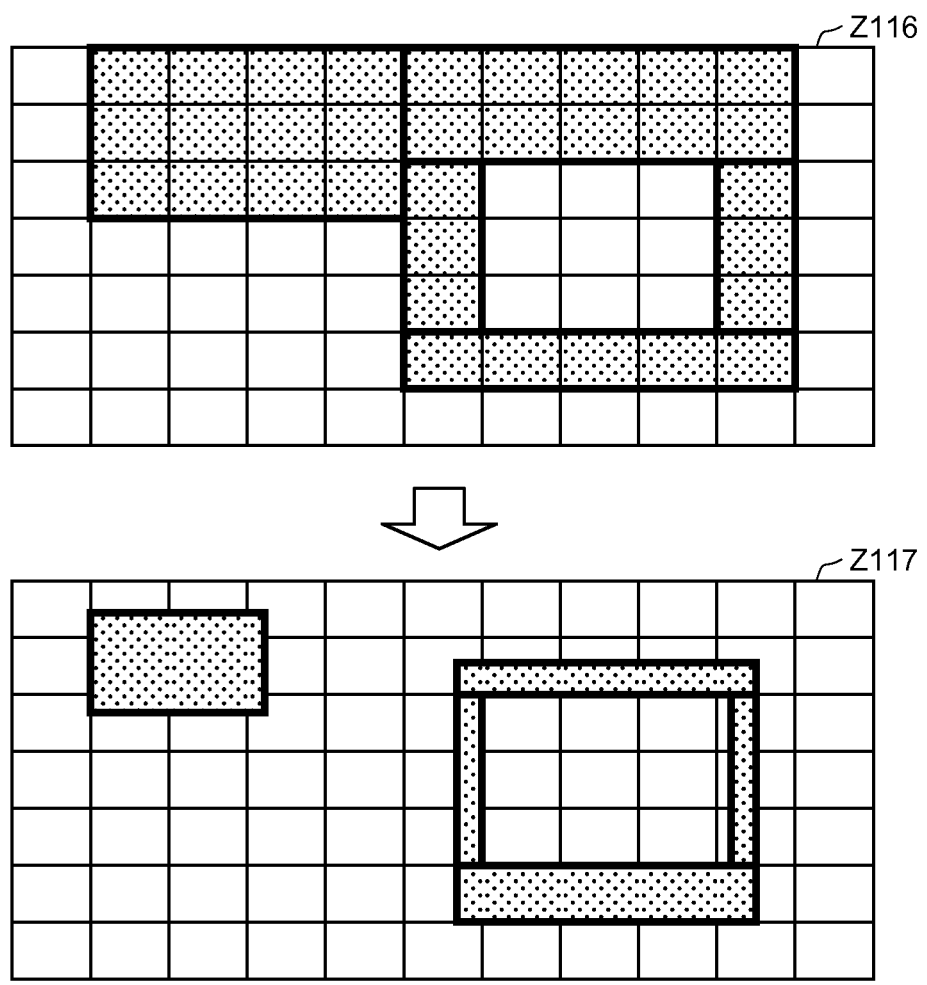
FIG. 6 is an illustration of update region boundary adjustment processing according to the second exemplary embodiment of the present invention.

The thick frames in Z116 of FIG. 6 show five update regions finally obtained through repetitive processing by the update region dividing means 134. The shaded region shows all the update regions.

Z117 shows a state after contracting the boundary lines of each update region by the update region boundary adjustment means 137. Regarding the entire update region (thick frames) in Z116, the respective boundary lines on top, bottom, left, and right are contracted up to the position where a differential pixel exists, and the update regions in Z117 are obtained.

Next, advantageous effects of the present embodiment will be described.

In the method in which a set of blocks including the pixels in which the pixel values are changed is used as an update region, the twenty three pieces of blocks, which are blacked in Z102, become update regions, respectively. Meanwhile, in the present embodiment, only five pieces shown by the thick lines in Z116 become update regions. Accordingly, an increase in the number of update regions can be restrained.

Further, in the method in which a circumscribed rectangle of all blocks including the pixels in which the pixel values are changed is used as an update region, a region of fifty four pieces of blocks in total, which is shaded in Z103, becomes an update region. Meanwhile, in the present embodiment, a size of thirty three pieces of blocks, surrounded by the thick lines in Z116, becomes an update region. Accordingly, the size of the update region can be reduced. It should be noted that the size of the update region can be further reduced by performing update region boundary adjustment processing as in Z117.

Further, in the method of detecting an update region by each block and integrating update regions linked vertically or horizontally into a circumscribed rectangle thereof, if a pixel difference is generated in a square frame-like shape as in Z101, the circumscribed rectangle of the frame is detected as an update region, whereby a region in which pixel values are not changed inside the frame is included in the update region. Meanwhile, in the present embodiment, a region in which pixel values are not changed inside the frame is removed from the update region, as shown in Z116.

[Third Exemplary Embodiment]

The present embodiment describes the first exemplary embodiment more specifically. FIGS. 3 to 5 and FIGS. 7 to 10 show specific examples of operation of the update region detection device according to the present embodiment. In the present embodiment, a threshold of the number of update regions is 7.

The operation from Z101 to Z107 in FIGS. 3 to 5 is the same as that of the second exemplary embodiment.

Figure 7:
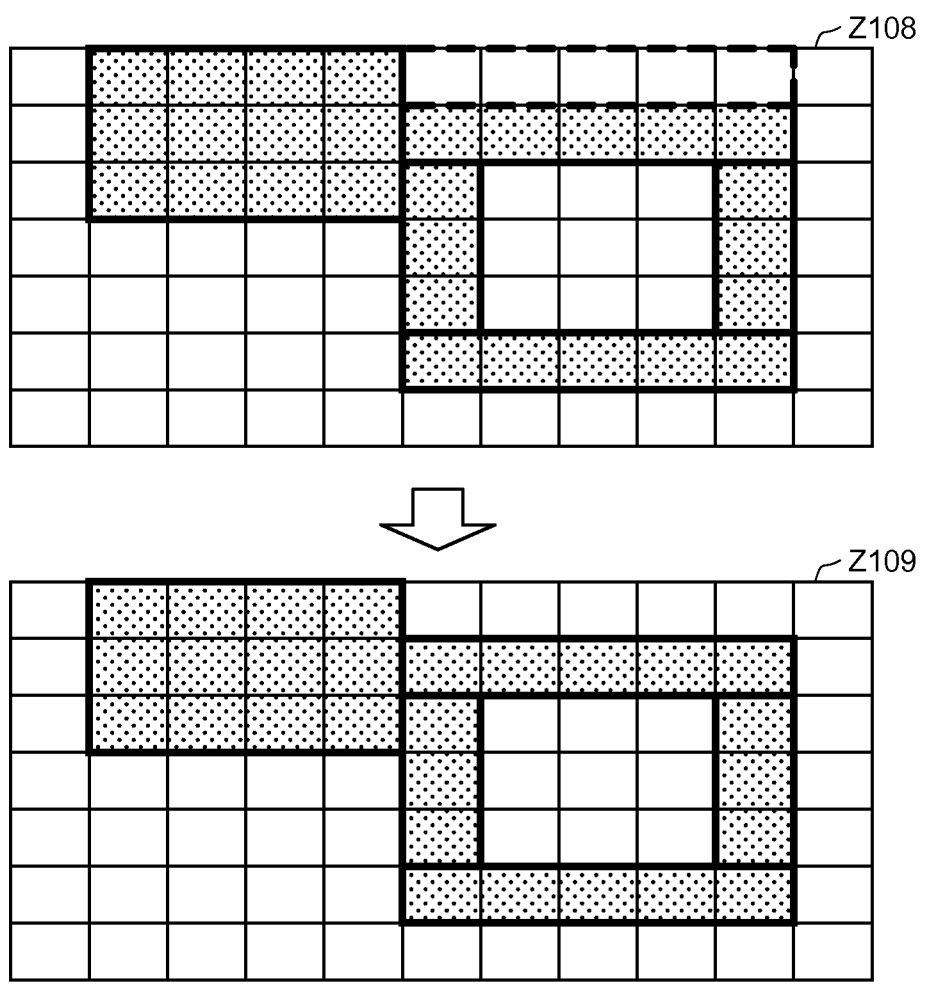
FIG. 7 is an illustration of update region division processing of the third time according to a third exemplary embodiment of the present invention.

Z108 in FIG. 7 shows a removal region detected by the removal region detection means 133 for the third time. A rectangle shown by broken lines is a removal region. The removal region detection means 133 detects a mass of non-update blocks from all update regions present in the screen (in this case, five), and detects one having the largest area as a removal region. Consequently, non-update blocks of 5×1 blocks, included in the update region at the top of the frame, are detected as a removal region.

Z109 shows a state of dividing the update region by the update region dividing means 134 for the third time. The shaded region is the entire update region registered at the current time, and the thick lines are boundary lines of a new update region generated by the division. As shown in Z108, the size of the update region to be divided is 5 blocks width×2 blocks height, which is horizontally long. Accordingly, a division method in which a vertical parting line is preferentially selected is taken. In this case, as there is only one dividing method of dividing it into upper and lower portions, the update region is divided into upper and lower portions, whereby one new update region as shown in Z109 is obtained.

Figure 8:
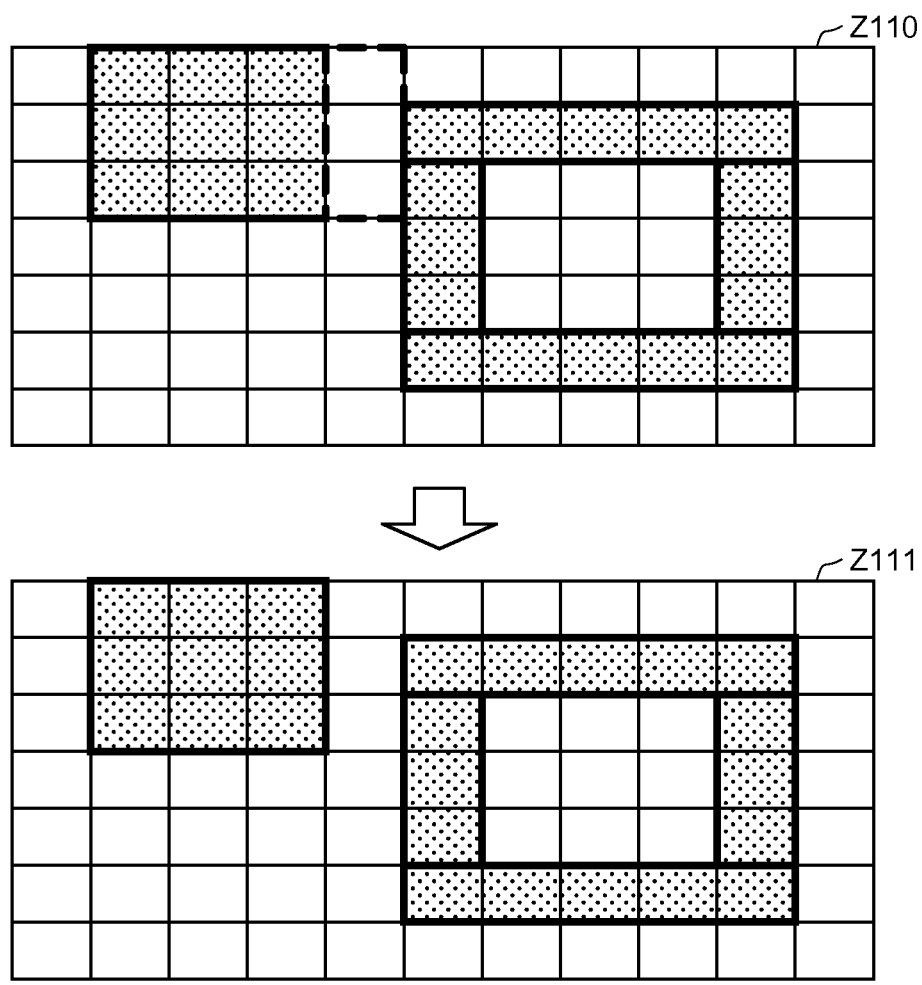
FIG. 8 is an illustration of update region division processing of the fourth time according to the third exemplary embodiment of the present invention.

Z110 in FIG. 8 shows a removal region detected by the removal region detection means 133 for the fourth time. A rectangle shown by broken lines is a removal region. The removal region detection means 133 detects a mass of non-update blocks from all update regions present in the screen (in this case, five), and detects one having the largest area as a removal region. Consequently, non-update blocks of 1×3 blocks, included in the update region at the left in the screen, are detected as a removal region.

Z111 shows a state of dividing the update region by the update region dividing means 134 for the fourth time. The shaded region is the entire update region registered at the current time, and the thick lines are boundary lines of a new update region generated by the division. As shown in Z110, the size of the update region to be divided is 4 blocks width×3 blocks height, which is horizontally long. Accordingly, a division method in which a vertical parting line is preferentially selected is taken. In this case, as there is only one dividing method of dividing it into left and right portions, the update region is divided into left and right portions, whereby one new update region as shown in Z111 is obtained.

Figure 9:
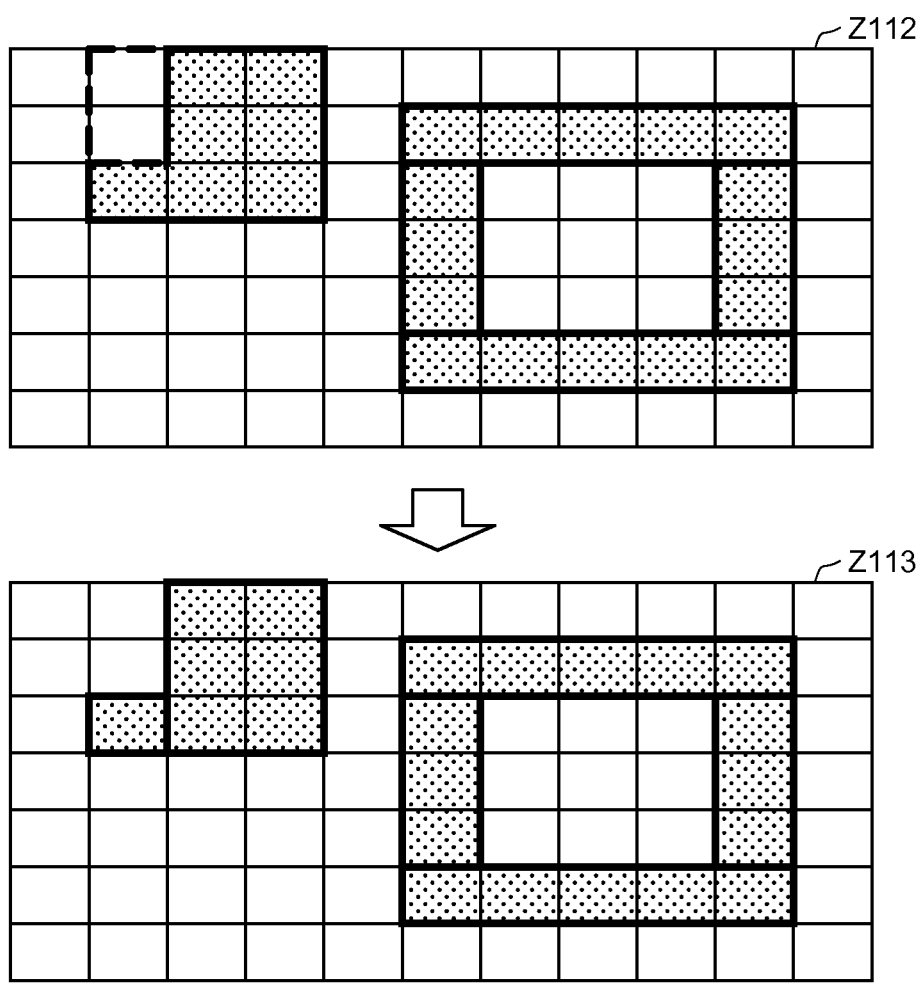
FIG. 9 is an illustration of update region division processing of the fifth time according to the third exemplary embodiment of the present invention.

Z112 in FIG. 9 shows a removal region detected by the removal region detection means 133 for the fifth time. A rectangle shown by broken lines is a removal region. The removal region detection means 133 detects a mass of non-update blocks from all update regions present in the screen (in this case, five), and detects one having the largest area as a removal region. Consequently, non-update blocks of 1×2 blocks, included in the update region at the left in the screen, are detected as a removal region.

Z113 shows a state of dividing the update region by the update region dividing means 134 for the fifth time. The shaded region is the entire update region registered at the current time, and the thick lines are boundary lines of new update regions generated by the division. As shown in Z112, the size of the update region to be divided is 3 blocks width×3 blocks height, which is not horizontally long. Accordingly, a division method in which a horizontal parting line is preferentially selected is taken. Consequently, the update region is divided into left and right portions in a form not including the removal region, whereby two new update regions as shown in Z113 are obtained.

After Z113, as no removal region is detected, division processing is not performed, and the processing proceeds to boundary adjustment processing.

Figure 10:
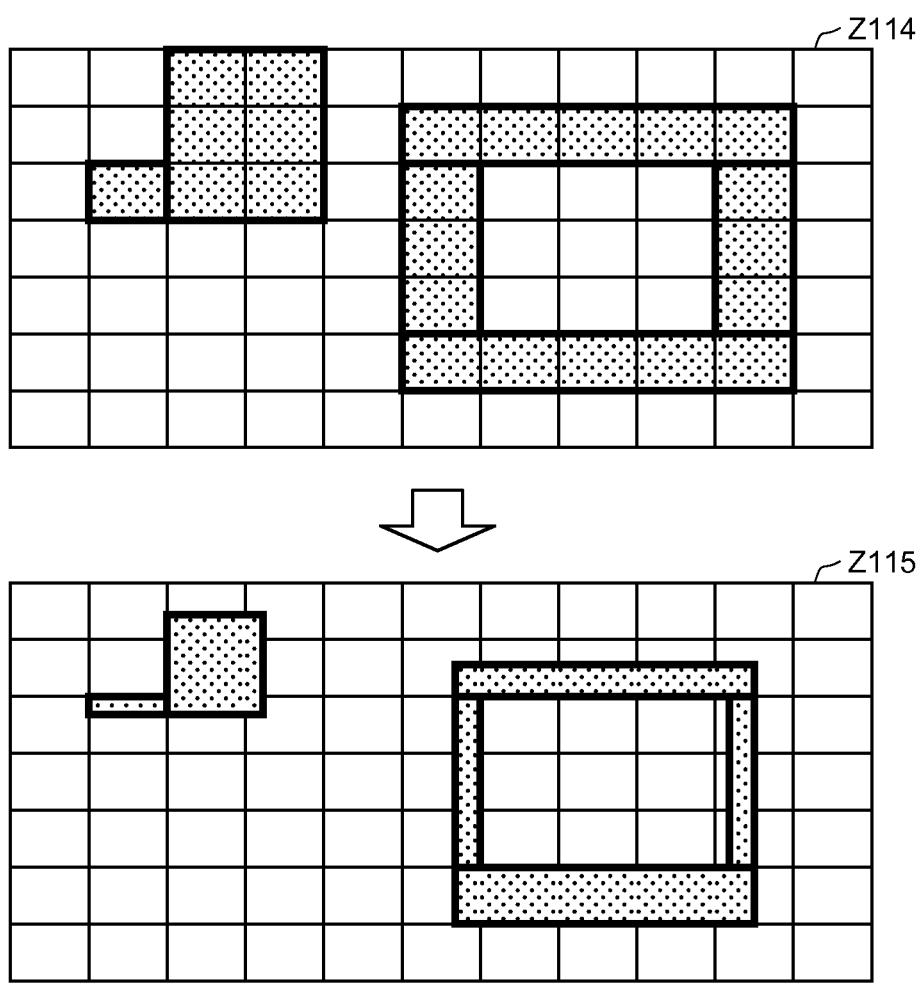
FIG. 10 is an illustration of update region boundary adjustment processing according to the third exemplary embodiment of the present invention.

The thick frames in Z114 of FIG. 10 show six update regions obtained finally through repetitive processing by the update region dividing means 134. The shaded regions show all the update regions.

Z115 shows a state after contraction of the boundaries of each update region has been performed by the update region boundary adjustment means 137. Regarding all update regions (thick frames) in Z114, the respective boundary lines at the top, bottom, left, and right are contracted up to a position where a differential pixel is present, and the update regions in Z115 are obtained.

As is clear from the above-described operation of the present embodiment, by repeating division of update regions until a new update region as a division target is not detected any more by the removal region detection means 133, it is possible to obtain update regions which covers update blocks in proper quantities and are not divided excessively.

[Other Exemplary Embodiments]

In the exemplary embodiments described above, after obtaining update regions in units of blocks, the boundaries of each update region are adjusted by the update region boundary adjustment means 137. However, it is possible to omit processing performed by the update region boundary adjustment means 137, regardless of the size of the blocks.

Further, in the exemplary embodiments described above, it is possible to further include encoding means for, after repetitive division processing is terminated or after the processing by the update region boundary adjustment means is terminated, encoding an image in each update region stored in the update region list memory among the images stored in the current frame memory 122, and it is also possible that the update region information output means 138 outputs the codes, output from the encoding means, to the region information output device 14, instead of outputting the content of the update region list memory 124.

The present invention is based upon and claims the benefit of priority from Japanese patent application No. 2012-164739, filed on Jul. 25, 2012, the disclosure of which is incorporated herein in its entirety by reference.

INDUSTRIAL APPLICABILITY

The present invention is applicable to reduction of transmission amount in a thin client system of a screen transmission type. Further, it is also applicable to other usages by utilizing a feature of efficiently expressing the coordinate of an update region on a screen at appropriate granularity. For example, by accumulating update coordinates of a screen obtained by the present invention as logs, it is possible to use the present invention to measure the number of rewrite times of the pixels of the screen to thereby estimate the degradation state.

REFERENCE NUMERALS

11 signal input device
12 data storage device
13 data processing device
14 region information output device
121 previous frame memory
122 current frame memory
123 update block memory
124 update region list memory
125 update region number memory
131 update block detection means
132 initial update region registration means
133 removal region detection means
134 update region dividing means
135 update region list rewrite means
136 division processing control means
137 update region boundary adjustment means
138 update region information output means

What is claimed is:

1. An update region detection device comprising:
    an update block detection unit implemented by at least hardware including a processor and that compares pixel values of pixels at a same position in a current frame and in a previous frame of an input video, and among blocks generated by dividing a frame into blocks, detects, as an update block, a block including a pixel in which a pixel value is changed;
    an initial update region registration unit implemented by at least the hardware and that registers a circumscribed rectangular region of all of the update blocks detected by the update block detection unit, as an update region, in an update region storage unit;
    a removal region detection unit implemented by at least the hardware and that detects a non-update region from among one or more update regions stored in the update region storage unit, the non-update region being a rectangle including blocks which do not include a pixel in which a pixel value is changed and are continued for one or more;
    an update region dividing unit implemented by at least the hardware and that divides the update region including the non-update region, detected by the removal region detection unit, into new update regions which are two or more rectangles not including the non-update region;
    an update region list rewrite unit implemented by at least the hardware and that deletes the update region before the division from the update region storage unit, and additionally registers the update regions after the division in the update region storage unit; and
    a division processing control unit implemented by at least the hardware and that controls repetition of division processing of the update region by the removal region detection unit, the update region dividing unit, and the update region list rewrite unit, and terminates the repetition of the division processing on a condition that a new non-update region is not detected any more by the removal region detection unit, or that the number of update regions stored in the update region storage unit after the additional registration exceeds a threshold, whichever is satisfied earlier.

2. The update region detection device, according to claim 1, further comprising
    an update region boundary adjustment unit implemented by at least the hardware and that, after termination of the repetition of the division processing, compares pixel values between the previous frame and the current frames for each of boundary lines on top, bottom, left, and right of each of all of the update regions stored in the update region storage unit, and contracts each of the boundary lines by one line in an inner direction of the update region until a difference is found within the boundary lines.

3. The update region detection device according to claim 2, further comprising
    an update region information output unit implemented by at least the hardware and information relating to the update region stored in the update region storage unit, after termination of processing by the update region boundary adjustment unit.

4. The update region detection device according to claim 2, further comprising
    an encoding unit implemented by at least the hardware and that encodes and outputs an image of the update region stored in the update region storage unit, of an image of the current frame, after termination of processing by the update region boundary adjustment unit.

5. The update region detection device according to claim 1, wherein
    the update region dividing unit divides the update region in such a manner as to give priority to division into left and right portions if a width of the update region to be divided is larger than a height of the update region, while give priority to division into upper and lower portions if the width is smaller than the height.

6. The update region detection device according to claim 1, wherein
    the removal region detection unit detects the non-update region having a largest area.

7. The update region detection device according to claim 1, wherein
    the removal region detection unit detects the non-update region having an area exceeding a lower limit value.

8. The update region detection device according to claim 1, wherein
    the removal region detection unit detects the non-update region having an area exceeding a lower limit value, and the lower limit value is changed to a smaller value according to progress of the repetition of the division processing.

9. The update region detection device according to claim 1, wherein
    for each of the update regions, the removal region detection unit detects, among the non- update regions of N×N (N is an integer of one or more) blocks included in the update region, the non-update region in which N is the largest, and finally detects the non-update region in which N is the largest in all of the update regions.

10. The update region detection device according to claim 1, wherein
    for each of the update regions, the removal region detection unit detects, among the non- update regions of N×N (N is an integer of one or more) blocks included in the update region, the non-update region in which N is the largest, attempts to expand top, bottom, left, and right of the detected non-update region by one block width to thereby detect the non-update region of M×L blocks (M≥N, L≥N), and finally detects the non-update region in which M×L is the largest in all of the update regions.

11. The update region detection device according to claim 1, further comprising
    an update region information output unit implemented by at least the hardware and that outputs information relating to the update region stored in the update region storage unit, after termination of the repetition of the division processing.

12. The update region detection device according to claim 1, further comprising
    an encoding unit implemented by at least the hardware and that encodes and outputs an image of the update region stored in the update region storage unit, of an image of the current frame, after termination of the repetition of the division processing.

13. An update region detection method comprising:
    an update block detection step of comparing pixel values of pixels at a same position in a current frame and in a previous frame of an input video, and among blocks generated by dividing a frame into blocks, detecting, as an update block, a block including a pixel in which a pixel value is changed;

an initial update region registration step of registering a circumscribed rectangular region of all of the detected update blocks as an update region in an update region storage unit;

a removal region detection step of detecting a non-update region from among one or more update regions stored in the update region storage unit, the non-update region being a rectangle including blocks which do not include a pixel in which a pixel value is changed and are continued for one or more;

an update region dividing step of dividing the update region including the detected non- update region into new update regions which are two or more rectangles not including the non-update region;

an update region list rewrite step of deleting the update region before the division from the update region storage unit, and additionally registering the update regions after the division in the update region storage unit; and a division processing control step of controlling repetition of division processing of the removal region detection step, the update region dividing step, and the update region list rewrite step, and terminating the repetition of the division processing on a condition that a new non- update region is not detected any more in the removal region detection step any more, or that the number of update regions stored in the update region storage unit after the additional registration exceeds a threshold, whichever is satisfied earlier.

14. A non-transitory computer-readable medium storing a program comprising instructions for causing a computer including a storage device to function as:

an update block detection unit that compares pixel values of pixels at a same position in a current frame and in a previous frame of an input video, and among blocks generated by dividing a frame into blocks, detects, as an update block, a block including a pixel in which a pixel value is changed;

an initial update region registration unit that registers a circumscribed rectangular region of all of the update blocks detected by the update block detection unit, as an update region, in the storage device;

a removal region detection unit that detects a non-update region from among one or more update regions stored in the storage device, the non-update region being a rectangle including blocks which do not include a pixel in which a pixel value is changed and are continued for one or more;

an update region dividing unit that divides the update region including the non-update region, detected by the removal region detection unit, into new update regions which are two or more rectangles not including the non-update region;

an update region list rewrite unit that deletes the update region before the division from the storage device, and additionally registers the update regions after the division in the storage device; and a division processing control unit that controls repetition of division processing of the update region by the removal region detection unit, the update region dividing unit, and the update region list rewrite unit, and terminating the repetition of the division processing on a condition that a new non-update region is not detected any more by the removal region detection unit, or that the number of update regions stored in the storage device after the additional registration exceeds a threshold, whichever is satisfied earlier.

* * * * *